(12) United States Patent
Bonn et al.

(10) Patent No.: US 11,634,066 B2
(45) Date of Patent: Apr. 25, 2023

(54) PROTECTIVE HOUSING FOR AUTOMOTIVE GLAZINGS AND OTHER APPLICATIONS

(71) Applicant: PITTSBURGH GLASS WORKS, LLC, Pittsburgh, PA (US)

(72) Inventors: Lindsay Bonn, Wexford, PA (US); Michael Iasella, Allison Park, PA (US); Lauren Black, Apollo, PA (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

(21) Appl. No.: 17/520,592

(22) Filed: Nov. 5, 2021

(65) Prior Publication Data

US 2022/0055528 A1 Feb. 24, 2022

Related U.S. Application Data

(63) Continuation-in-part of application No. 17/005,996, filed on Aug. 28, 2020, now Pat. No. 11,167,531.

(Continued)

(51) Int. Cl.
*B60Q 1/26* (2006.01)
*B32B 17/10* (2006.01)
(Continued)

(52) U.S. Cl.
CPC .............. *B60Q 1/268* (2013.01); *B32B 3/08* (2013.01); *B32B 7/12* (2013.01);
(Continued)

(58) Field of Classification Search
CPC ..................... B32B 17/10541; B60Q 1/268
See application file for complete search history.

(56) References Cited

U.S. PATENT DOCUMENTS

| 10,059,258 B2 * | 8/2018 | Shigaki .................. G09F 13/06 |
| 2010/0020381 A1 * | 1/2010 | Legois ............. B32B 17/10293 |
| | | 359/275 |

(Continued)

*Primary Examiner* — Keith G. Delahoussaye
(74) *Attorney, Agent, or Firm* — Dentons Cohen & Grigsby P.C.

(57) ABSTRACT

A protective housing wherein two parts (102, 104) of the housing may be closed together to encapsulate connectors and associated components that are external to the glazing laminate. The protective housing is sealed to the glazing and between the two parts to provide a fluid-tight housing. The parts of the protective housing are connected to the glazing and to each other by adhesive layers (116, 118, 120).

A vehicle glazing (10) wherein a light guide stack (22) is located between a portion of the inner transparency (26) and the outer transparency (28). The light guide stack includes a polycarbonate film (32) that is bonded to the transparencies by layers of PET (38, 40) that are secured to the polycarbonate film on one side by silicone (34, 36) and that are secured to the transparencies on the other side by PVB (42, 44). The terminal end of an extending tab of the polycarbonate film forms an edge that is connected to a light bar (14) that such visible light propagates through the light bar and into the polycarbonate film through the edge. Visible light propagates through etchings in the smooth surface of the polycarbonate film to form an image. An extension of one of the transparencies protects the polycarbonate tab and supports the light bar during installation of the glazing into the vehicle portal.

21 Claims, 11 Drawing Sheets

Related U.S. Application Data

(60) Provisional application No. 63/177,100, filed on Apr. 20, 2021, provisional application No. 62/894,037, filed on Aug. 30, 2019.

(51) Int. Cl.
     *B32B 7/12*     (2006.01)
     *B32B 3/08*     (2006.01)

(52) U.S. Cl.
     CPC .. *B32B 17/10036* (2013.01); *B32B 17/10302* (2013.01); *B32B 17/10541* (2013.01); *B32B 17/10752* (2013.01); *B32B 2250/44* (2013.01); *B32B 2307/538* (2013.01); *B32B 2457/20* (2013.01)

(56) References Cited

U.S. PATENT DOCUMENTS

| | | | |
|---|---|---|---|
| 2019/0009503 A1* | 1/2019 | Labrot | B32B 17/10348 |
| 2019/0022981 A1* | 1/2019 | Labrot | B60R 1/001 |
| 2019/0022985 A1* | 1/2019 | Labrot | B32B 17/10788 |

* cited by examiner

PROTECTIVE HOUSING FOR AUTOMOTIVE GLAZINGS AND OTHER APPLICATIONS

CROSS REFERENCE TO RELATED APPLICATIONS

This application is a continuation-in-part application of pending application Ser. No. 17/005,996, filed Aug. 28, 2020, which claims priority to provisional Application Ser. No. 62/894,037, filed Aug. 30, 2019. This application also claims the benefit of prior U.S. Provisional Application Ser. No. 63/177,100, filed on Apr. 20, 2021, the contents incorporated by reference herein.

BACKGROUND OF THE PRESENTLY PREFERRED INVENTION

Field of the Invention

The presently disclosed invention relates to glazings that are suitable for use in vehicle windows as well as fixtures and methods for maintaining and installing such glazings.

Discussion of the Prior Art

Vehicle development is trending to electric and even autonomous vehicles. In addition, there also is a need for communications from the vehicle to persons outside the vehicle such as pedestrians and other vehicle operators. For these and other reasons, there has been growing interest in vehicle glazings that cooperate with various sensors to communicate with vehicle operators and others by means of designs and alpha-numeric codes that are displayed in the glazing. Such combinations also support "heads-up" displays that are sometimes deemed to be safer and more reliable than alternative information systems and methods.

Such combinations and glazing improvements require respective inputs and outputs for carrying communicative signals such as command signals and signals that carry collected information. Such inputs and outputs may be designed for electronic, light-based, acoustic or other communication media.

For example, attention has been directed to systems that incorporate LED front lighting technology. LEDs are favored in light guide designs that are intended for high-performance because they have relatively high in-coupling efficiency. In those systems, a preferred material for directing light into the light guide has a high refractive index and a high reflectance. Inside the light guide, the light is repeatedly reflected back and forth from the surfaces as it proceeds through the light guide in the direction of the net internal reflection to the end of the light guide. In particular, LED front lighting has been found to afford lower power demands than conventional backlighting techniques. In LED front-lighting systems, a light-guide displays a fixed image in response to illumination from a light emitting diode in the "on" state. The image is not visible at times when the LED is in the "off" state.

A "light guide" is an optically transparent material that is capable of conducting and distributing visible light. Light guide materials employ a principle of reflection caused by different refractive indices of two materials. Light guides are used to distribute a light source homogenously over a given area. Examples of such light guide applications include LCD backlighting, information displays, mood lighting, and design light effects.

In front lighting, all the power is used to create the light image (as opposed to creating a silhouette of an illuminated panel). For example, Azumo supplies an LED front lighting product that incorporates an ultra-thin, flexible light guide in the form of a film or sheet. A light-guide film that is thinner than a piece of paper is illuminated through the edge of the film from a light stick or bar. Typically, LEDs are too large to merely butt up to the edge of the film. Instead, a light bar is attached to the edge of the thin film and an LED is focused on the end of the light bar to propagate visible light into the film.

System types may be light-based, electronic or other types. In most cases, the system includes wire leads, light guides and other conductors that are connected to compatible devices or accessories such as amplifiers, transformers, controllers, and the like that are external to the glazing and that are connected to the glazing by various conductors. In many cases, the conductors may be relatively delicate or fragile with respect to the glazing or in comparison to other system components, devices and structure that may surround the glazing. For example, the connections may be thin wires or lightguide strands that can be damaged or broken if they are mishandled or unnecessarily stressed or impacted. As one example, in some cases glazing installers on a vehicle assembly line may inadvertently strike the connectors against the vehicle frame while installing the glazing and break the connector.

Light guide films may serve as one particular example concerning hazards and risks that attend the use of glazings that have connections to external components. In a vehicle glazing, an ultra-thin light guide film can conform to many contours such that it is compatible with many glazing shapes. The ultra-thin light guide film radiates visible light from the film surface according to surface etchings. Thus, the film can transmit a message according to designs and alpha-numeric sequences that are etched into the face surface of the light guide film. By way of example, such messages could be conventional road signs and/or written instructions.

A typical thin-film light guide may have a thickness in the range of about 25 to 75 microns. A light-bar is used to propagate light in the range of visible wavelengths into an edge of the film. Light that is transmitted into the light-guide film is generally confined between the smooth face surfaces of the film except in those areas where the smooth face surface is disturbed by etching or other surface discontinuities. It has been found that this arrangement demands relatively low power and affords comparatively high uniformity, good contrast, good color range and full viewing angles.

An ultra-thin light guide may be a film of polycarbonate material ("PC") that serves as the light-guide and light transporting film. Vehicle glazings typically employ polyvinyl butyral (PVB) as interlayers. PC does not adhere to PVB, but PC will adhere to ethylene-vinyl acetate (EVA) and also to polyurethane (PU) so that EVA of PU layers can be used in a light guide stack on opposite faces of the PC film to adhere the light guide to an adjacent transparency.

In addition, polyethylene terephthalate (PET) does adhere to PVB and urethane and silicone can be used with PC as bonding agents. Accordingly, a PC layer or film in a light-guide stack may include transparent layers of PET that oppose opposite faces of the PC film. A PVB layer is added to one side of the PET layer to adhere to an adjacent transparency. Because PET does not laminate to PC, the PET layers are bonded to the PC layer with an adhesive such as silicon.

In making further improvements concerning the application of light guide technology to vehicle glazings, a connection is required between the light guide that is external to the glazing and the light guide film that is laminated in the glazing. It has been found that this connection can be subject to tearing or stretching during the process of installing the glazing in the vehicle. The light guide systems are somewhat prone to such damage because the light guide film is relatively delicate and the light guide itself is relatively heavy and, in some circumstances, difficult to place in the space allowed by the window frame.

SUMMARY OF THE DISCLOSED PROTECTIVE HOUSING

In accordance with the disclosed protective housing, a preferred embodiment of the disclosed protective housing includes a first part and a second part. The first part and second part are complementary to each other such that they are manufactured as separate parts and then brought together in mating relationship at times when the protective housing is to be applied to a particular glazing. The first and second parts are connected by an irreversible snap tab although other types of connectors (both reversible and irreversible) are within the scope of the presently disclosed protective housing.

In a disclosed application, the protective housing is combined with a vehicle glazing wherein a light guide film is laminated between two external glass layers. The first part of the protective housing is connected to a glass layer of the glazing by a layer of adhesive. The second part of the protective housing is connected to a second glass layer of the glazing by a second layer of adhesive. Additionally, the two housing parts are secured to each other by a third layer of adhesive. Also, one part of the housing is sealed against the passage of fluids between that part and a glass layer by a first seal. The second part of the housing is sealed against the passage of fluids between that part and the second glass layer by a second seal. In addition, a third seal between the two parts of the housing also prevents the passage of fluids between those two parts.

In the particular embodiment of FIGS. 1-4, the disclosed protective housing is used to protect external connections of a light guide glazing. More specifically, the protective housing 100 is used to protect the portion of the light guide film that extends beyond the perimeter edge of the glass layers of the glazing and connects to a light bar or light guide. When the two parts of the housing are secured to each other and to the glass layers of the glazing, the protective housing provides a mechanical housing around the light guide film and light bar or light guide that protects and supports the light guide film and light guide from damage due to mechanical impacts, exposure to corrosive or other harmful elements, as well as other hazards.

Given the particular application of the disclosed protective housing in connection with a light guide glazing, the protective housing further includes features for accommodating thermal dissipation that is required for a light bar or light guide. The protective housing completely envelops the light guide, but still affords adequate heat dissipation for the light guide. The protective housing includes a heat sink in one part of the housing and a second heat sink in the second part of the housing. Each heat sink is in contact with the light guide at times when the two parts of the housing are closed together. In this way heat generated in the light guide is thermally conducted to the exterior surface of the two parts of the housing and dissipates to the environment. FIG. 3 shows two snap tabs for joining the two parts of the housing.

Referring to other applications of the disclosed protective housing, it will be apparent to those skilled in the art that the protective housing also may be used to protect various types of connectors that extend externally from a glazing. In addition, the protective housing may also be formed to further protect controllers, circuit boards and other electronic components that are connected to glazings, particularly vehicular glazings.

As shown in FIG. 6, a glazing that projects light in the form of an image includes a glazing laminate that has at least one transparency and a light guide laminate stack that includes a PC film. The surface of the PC film is etched according to designs or symbols in the form designed to communicate a message. When visible light is propagated through a side edge of the film, light is emitted from the etched portions of the surfaces according to the shape of the etched designs and symbols.

In some cases, a light source is added to the glazing before it is delivered to the location of vehicle assembly. In other cases, the light source is added at the time the glazing is mounted in the vehicle portal for the glazing.

The glazing laminate may include a film that has cladding layers of polyethylene terephthalate (PET) on one or both sides of the PC film. The PET layers may be secured to the PC with a bonding agent such as silicone.

In vehicle glazings that include more than one transparency sheet, the transparency sheets are typically separated by an interlayer such as PVB or other suitable material. To match the thickness of the light guide laminate stack to the thickness of those portions of the glazing that include an interlayer, the light guide laminate stack may sometimes include one or more spacing layers. In a preferred embodiment, spacing layers may be comprised of EVA, PU, PVB and combinations thereof.

To aid in the lamination process, a partial vacuum is applied to the light guide laminate stack to remove air that is trapped between the layers of the stack. In some cases, the glazing may include a transparency sheet that has a perimeter side edge that defines the outer perimeter of the transparency sheet in combination with a light guide laminate stack having a PC film that terminates in a film edge. The film edge is located inside the perimeter of the transparency sheet such that it may be connected to a light source that is connectable to the transparency sheet. In this way, the transparency extends beyond the PC film and guards against inadvertent bending, crushing or other impacts to the PC film. This protection is especially important during the time when the light guide glazing is installed in the vehicle portal. At that point, the glazing assembly has been heat-treated to bond the laminate layers of the glazing process. The heat-treatment process tends to embrittle the polycarbonate tab and make it more susceptible to damage from impacts with the vehicle body. Glazings wherein the film edge is located inside the perimeter of the transparency sheet can be deaired with a vacuum bag. In some cases of glazings constructed in this way, the light source can be added before heat treating the light guide glazing so that the glazing and light guide are assembled when they arrive at the location for installing the glazing. This avoids the need for connecting the light source to the glazing laminate during the vehicle assembly process.

In other cases, the glazing may include a transparency sheet that has a perimeter side edge that defines the outer perimeter of the transparency sheet in combination with a light guide laminate stack having a PC film that terminates in a film edge that is located outside the perimeter of the transparency sheet. In this way, the polycarbonate film of the light guide stack extends to form a light guide tab. The glazing may be deaired before a light source is attached to the PC film by using a vacuum collar that surrounds the transparency sheet and the light guide stack adjacent its perimeter edge. Glazings constructed in this way can be manufactured faster because deairing with a vacuum collar is faster than deairing with a vacuum bag.

Preferably, the disclosed glazing includes a first transparency, a second transparency, and a light guide laminate stack that is disposed between portions of the first transparency and the second transparency. The light guide laminate stack includes a polycarbonate film that defines oppositely disposed major surfaces. Portions of the oppositely disposed major surfaces define a smooth, continuous surface, but at least one portion of at least one of the major surfaces defines interruptions in the smooth continuous surface of the major surfaces. Light in the visible light spectrum propagates through the polycarbonate film between the smooth, continuous portions of the major surfaces of the polycarbonate film, but the light passes out of the polycarbonate film through the interruptions in the smooth, continuous surface. An interlayer is located between portions of said first transparency and said second transparency where there is no light guide laminate stack. The interlayer has a nominal thickness that is approximately the same nominal thickness as the light guide stack to limit bubbles and distortions in the area of the glazing where the light guide stack butts against the interlayer from occurring during manufacture of the glazing. A light bar is connected to an edge of the polycarbonate film so that light in the visible spectrum propagates from the light bar, through the edge of the polycarbonate film, and into the polycarbonate film.

FIGS. 4 and 5 show the presently disclosed protective housing in combination with an alternative form of light guide glazing that is further described herein in connection with FIGS. 11 and 12. FIGS. 4 and 5 illustrate that one glass layer of the glazing extends beyond the perimeter of the other glass layer. In this way, the extending glass layer forms a ridge or shelf that is capable of supporting the light bar that is the light source for the light guide film. FIGS. 4 and 5 illustrate how a protective housing as herein disclosed is protective of the light bar and light film that are external to the perimeter edge of the smaller glass layer of the glazing.

In FIGS. 4 and 5, a protective housing includes a part that is secured to two glass layers to cover and protect the light bar and the portion of the light guide film that extends between the edge of smaller glass layer and the light bar. The protective housing is sealed to one of the glass layers by a bead of urethane or other suitable adhesive.

Other objects and advantages of the presently disclosed invention will become apparent to those skilled in the art as a detailed description of several presently preferred embodiments proceeds.

BRIEF DESCRIPTION OF THE DRAWINGS

Several presently preferred embodiments of the presently disclosed protective housing are shown and described herein in connection with the accompanying drawings wherein.

DESCRIPTION OF PRESENTLY PREFERRED EMBODIMENTS OF THE DISCLOSED PROTECTIVE HOUSING

Figure 1:
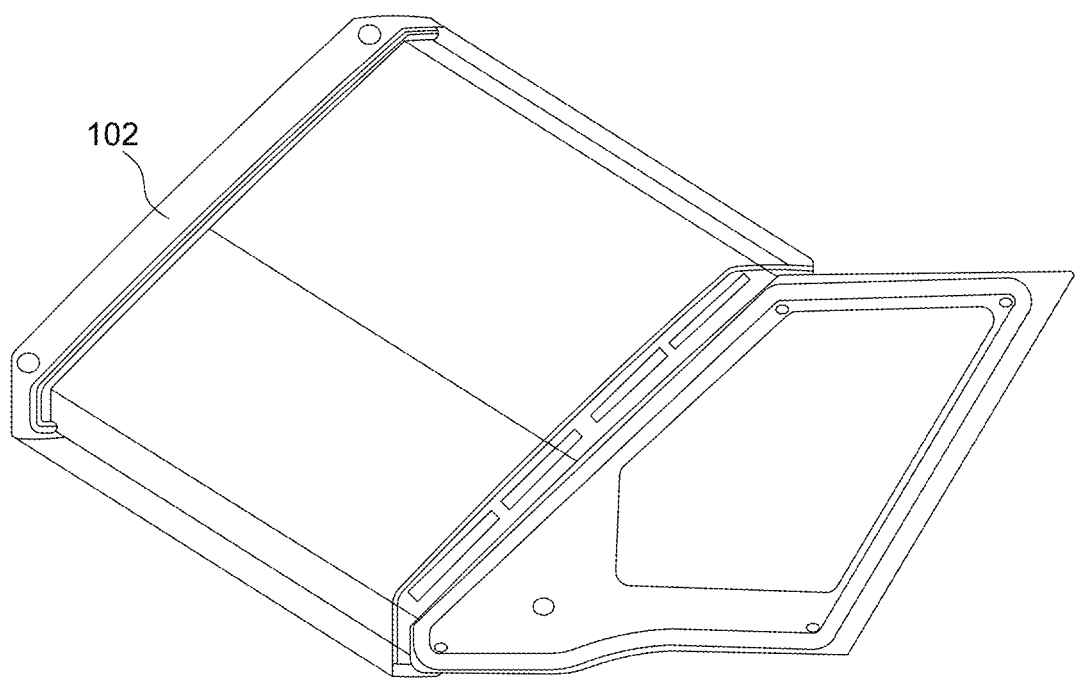
FIG. 1 is a partially exploded perspective view of the presently disclosed protective housing in cooperation with a glazing that includes light guide features.
Figure 2:
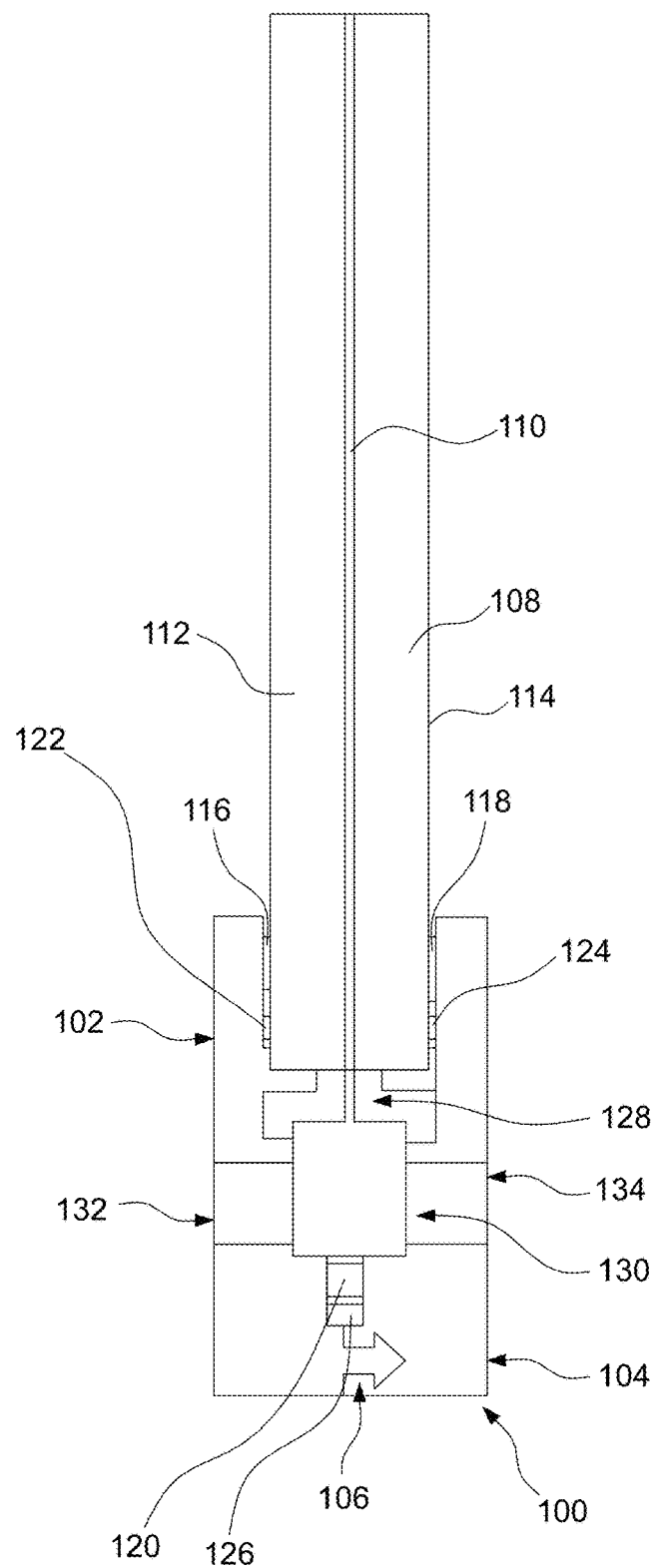
FIG. 2 is a cross-section of the protective housing and glazing that are shown in FIG. 1.

The presently disclosed protective housing is shown and described in connection with a glazing laminate although other applications of the presently disclosed protective housing will become apparent to those skilled in the art as the description of presently preferred embodiments of the protective housing proceeds. Referring to FIGS. 1 and 2, a preferred embodiment of the disclosed protective housing 100 includes a first part 102 and a second part 104. First part 102 and second part 104 are complementary to each other such that they are manufactured as separate parts and then brought together in mating relationship at times when the protective housing is to be applied to a particular glazing. Parts 102 and 104 are connected by an irreversible snap tab 106 although other types of connectors (both reversible and irreversible) are within the scope of the presently disclosed protective housing.

Figure 6:
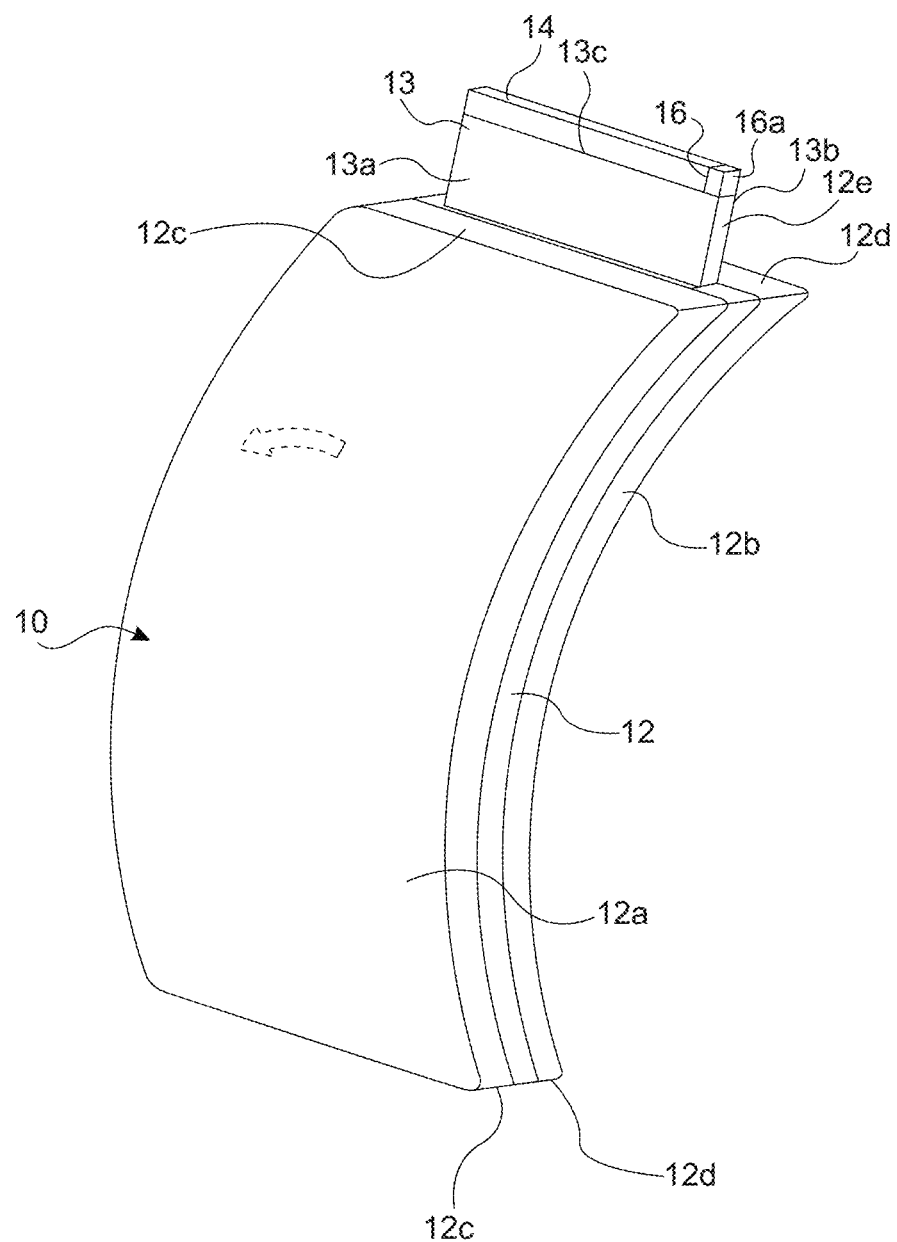
FIG. 6 is a perspective view of a light guide glazing on a type that is shown in FIG. 1.

As particularly shown in FIG. 2, protective housing 100 is combined with a vehicle glazing 108 wherein a light guide film 110 is laminated between two external glass layers 112 and 114. Glazing 108 is more particularly shown and described in connection with FIGS. 6-8. First part 102 of protective housing 100 is connected to glass layer 112 by a layer of adhesive 116 and second part 104 is connected to glass layer 114 by a second layer of adhesive 118. Additionally, parts 102 and 104 are secured to each other by a third layer of adhesive 120. Also, part 102 is sealed against the passage of fluids between part 102 and glass layer 112 by a first seal 122 and part 104 is sealed against the passage of fluids between part 104 and glass layer 114 by a second seal 124. In addition, a third seal 126 between part 102 and part 104 also prevents the passage of fluids between parts 102 and 104. Seals 122, 124 and 126 may be made of rubber or other material that is suitably resilient and resistant to exposures to the environment for which it is intended.

In the particular embodiment of FIGS. 1-4, the disclosed protective housing is used to protect certain external connections of a light guide glazing. More specifically, the protective housing 100 is used to protect the portion 128 of light guide film 110 that extends beyond the perimeter edge of the glass layers 112 and 114 and connects to a light bar or light guide 130. When parts 102 and 104 are secured to each other and to glass layers 112 and 114, protective housing 100 provides a mechanical housing around light guide film 128 and light bar or light guide 130 that protects and supports light guide film 128 and light guide 130 from damage due to mechanical impacts, exposure to corrosive or other harmful elements, as well as other hazards.

Given the particular application of the disclosed protective housing 100 in connection with a light guide glazing, protective housing 100 further includes features for accommodating thermal dissipation that is required for light bar or light guide 130. An operating requirement for light guides is that they must be capable of dissipating heat at a given minimum rate. Protective housing 100 completely envelops light guide 130, but the housing still affords adequate heat dissipation for light guide 130. Protective housing 100 includes a heat sink 132 in part 102 and a heat sink 134 in part 104. Heat sinks 132 and 134 are each in contact with light guide 130 at times when parts 102 and 104 are closed together. In this way heat generated in light guide 130 is thermally conducted to the exterior surface of parts 132 and 134 and dissipates to the environment. Heat sinks 132 and 134 may be composed of any material that has sufficient thermal conductivity to maintain light guide 130 below the recommended operating temperature and that forms a bond or seal with the adjacent portions of parts 102 and 104.

Figure 3:
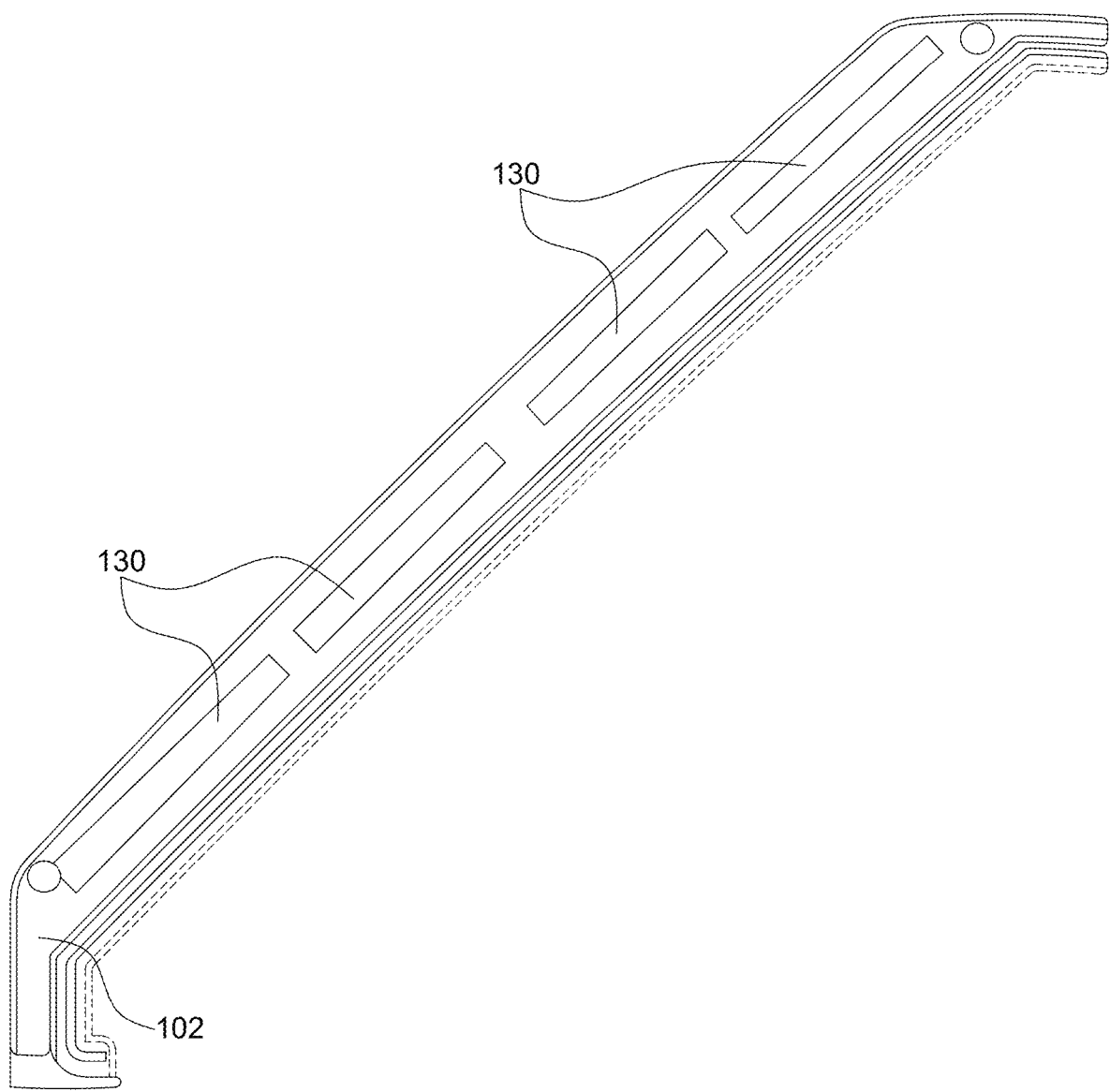
FIG. 3 is an enlarged view of portions of the protective housing and glazing that are shown in FIGS. 1 and 2.

FIG. 3 shows another view of the protective housing that is shown in FIGS. 1 and 2. In FIG. 3, part 102 is shown to have two snap tabs 106 for joining part 102 with part 104. Light guides 130 that are enveloped by protective housing 100 are also shown. Seal 122 that is shown in FIGS. 1 and 2 is also shown in FIG. 3.

Referring to other applications of the disclosed protective housing, it will be apparent to those skilled in the art that the protective housing also may be used to protect various types of connectors that extend externally from a glazing. In addition, the protective housing may also be formed to further protect controllers, circuit boards and other electronic components that are connected to glazings, particularly vehicular glazings.

Figure 7:
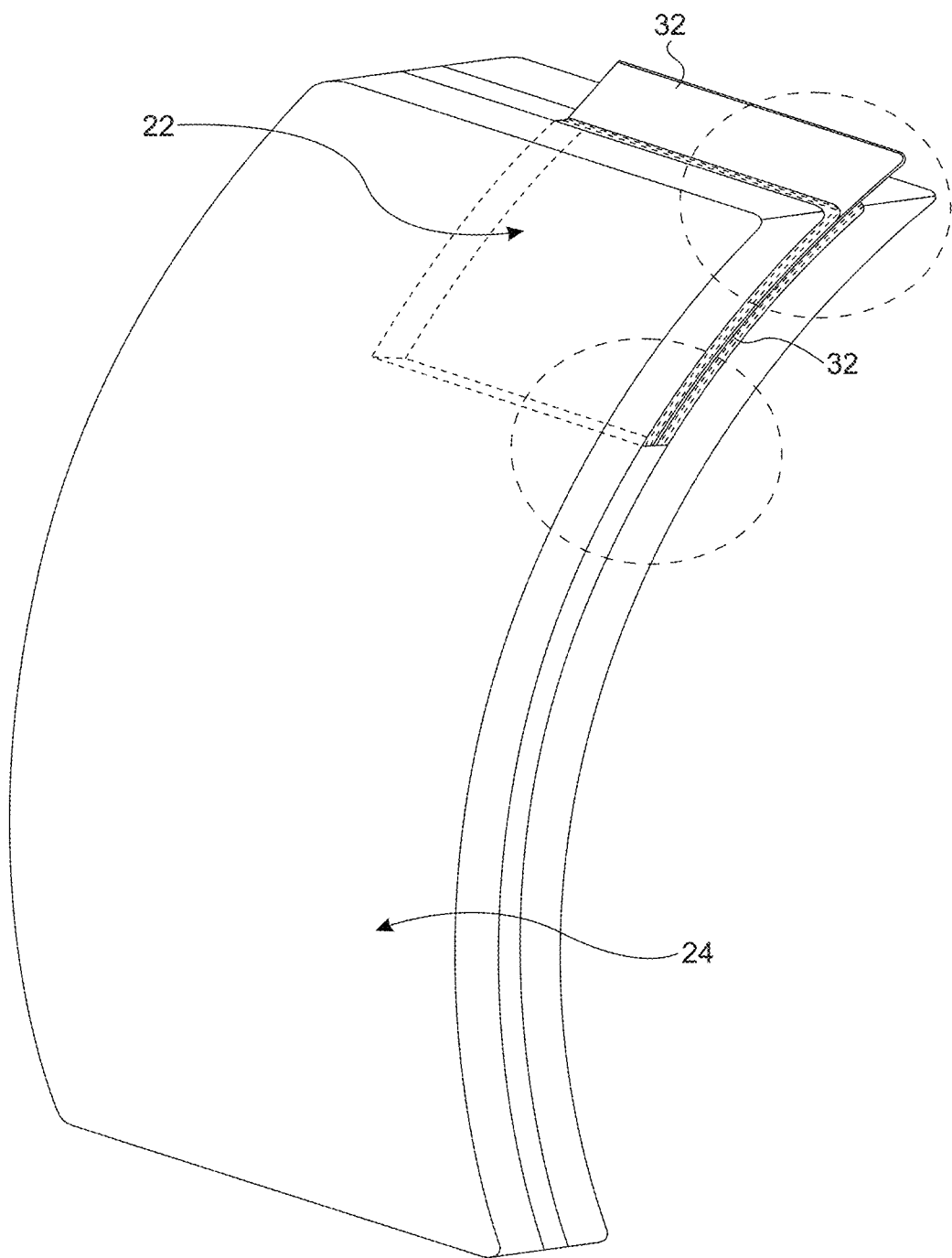
FIG. 7 is a perspective view of the light guide glazing of FIG. 6 that shows further detail of the light guide, including an extended light guide tab that is available for connection to a light source such as a light bar.
Figure 8:
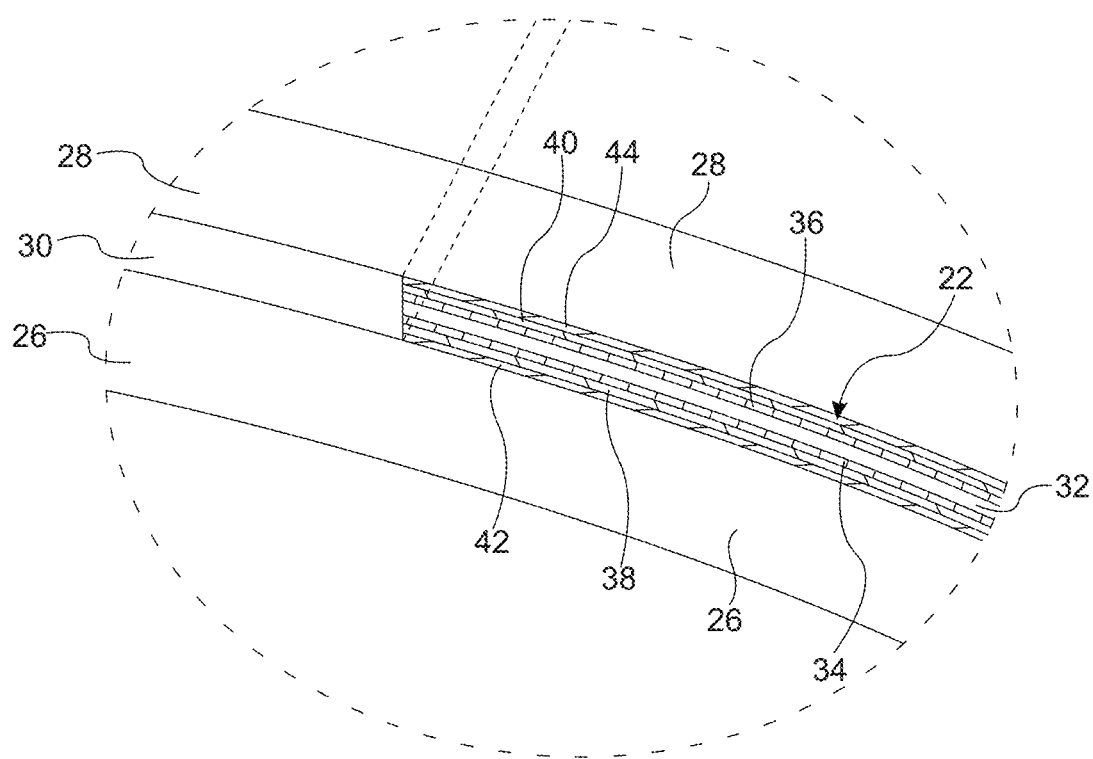
FIG. 8 is an enlarged portion of the light guide glazing shown in FIG. 8 showing further detail of the glazing in FIG. 7.
Figure 9:
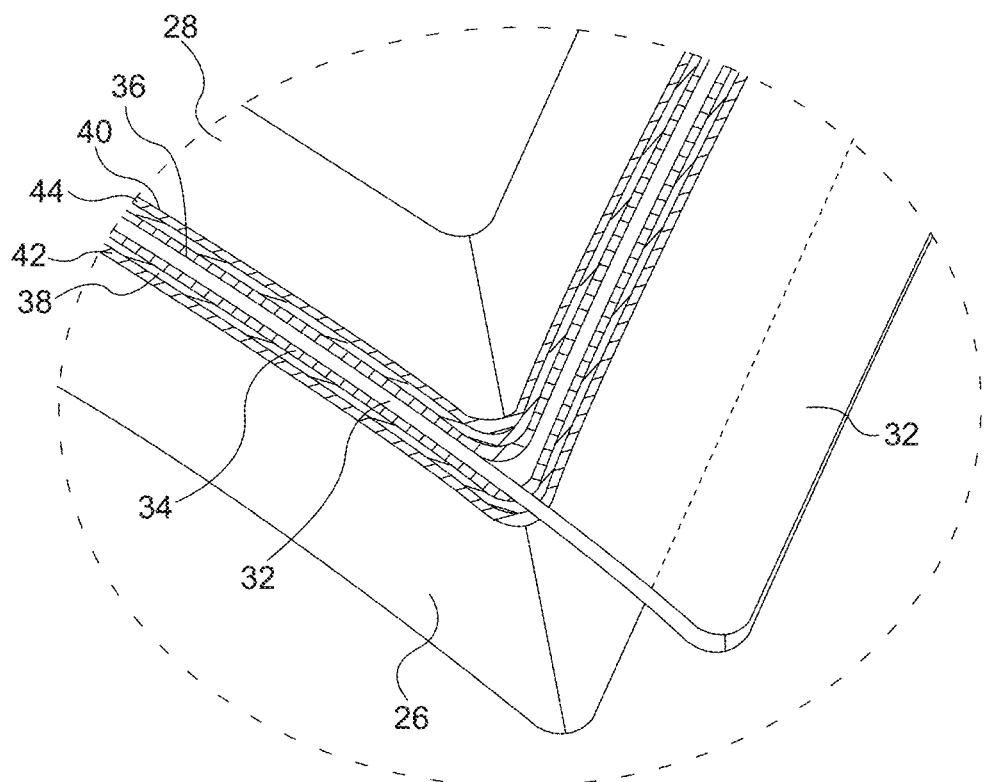
FIG. 9 is another enlarged portion of the light guide glazing shown in FIG. 7 showing further detail of the glazing, including an extension of the PC film.

The glazing laminate shown in FIG. 1 is more specifically shown and described in connection with FIGS. 7-9. Referring to FIGS. 7-9, a glazing laminate that includes at least one transparency sheet is combined with a light guide laminate stack is useful for application in vehicles. In many vehicles, side lights include only a single transparency sheet while the forward facing glazings such as windshields include two or more transparencies that are separated by an interlayer. Although a presently preferred embodiment is described in connection with a windshield, the disclosed invention is also applicable to glazings that typically employ a single transparency sheet.

In accordance with the embodiment illustrated in FIGS. 6-9, a vehicle glazing 10 may be used as a windshield. In glazing 10 a light-guide stack is applied within the daylight opening ("DLO") of the windshield. Glazing 10 incorporates a light guide stack 12 that includes a polycarbonate ("PC") film. Glazing 10 includes a first transparency sheet 12a and a second transparency sheet 12b that are arranged on opposite sides of light guide stack 12. Transparency sheet 12a defines a perimeter side edge 12c that defines the perimeter of transparency sheet 12a and transparency sheet 12b defines a perimeter side edge 12d that defines the perimeter of transparency sheet 12b. Light guide stack 12 also defines a tab 13 wherein PC film 12e of light guide stack 12 extends outside the perimeter of transparency sheet 12a and extends outside the perimeter of transparency sheet 12b. Throughout light guide stack 12, PC film 12e defines a surface 13a that faces transparency sheet 12a and a surface 13b that faces transparency sheet 12b. Surface 13a is oppositely disposed on PC film 12e from surface 13b and a film edge 13c is located between surface 13a and surface 13b. Portions of film surface 13a and portions of surface 13b each define a smooth, continuous surface. Light in the visible light spectrum that illuminates film edge 13c propagates through PC film 12e between the smooth, continuous portions of the film surface 13a and film surface 13b.

At times when glazing 10 is installed in a vehicle, a light source such as a light-bar 14 may illuminate film edge 13c to cause light to propagate through PC film 12e. In some cases, the light source such as light guide 14 may be adhered to a portion of film edge 13c on PC tab 13. In other cases, the light source such as light guide 14 may be adhered to a portion of the film edge 13c that is located at the perimeter defined by the perimeter side edge 12c of transparency sheet 12a or at the perimeter defined by the perimeter side edge 12d of transparency sheet 12b or at the perimeters of both transparency sheets 12a and 12b.

When an end 16 of light bar 14 is irradiated with visible light such as, for example, from an LED 16a, the light from the LED propagates through light bar 14 and through the adjoining film edge 13c of PC film 12e. Inside PC film 12e, light propagates between the smooth face surfaces 13a and 13b of PC film 12e. Portions of surface 13a or 13b of PC film 12c may define a pattern of irregularities so that the surface is discontinuous. Such patterns can be made by etching or similar process to create a pattern in the shape of alpha-numeric characters, designs, or other images. Light traveling through PC film 12e between surfaces 13a and 13b passes out of PC film 12e through the irregularities or discontinuities formed by the etchings so that the light forms a visible pattern according to the pattern of the discontinuities in surface 13a or 13b. In this way, surfaces 13a or 13b may be scored or etched with designs or alpha-numeric sequences to form readable messages or instructive images. In the example of FIG. 1, the design illustrates a visible message that warns of a road curve.

Further details of the vehicle glazing are shown in FIGS. 7 and 8. FIG. 7 illustrates a light-guide stack 22 that extends over only a portion of the daylight opening (DLO) of a vehicle glazing 24. Details of the glazing transparencies, the interlayer that separates the transparencies, and light-guide stack 22 are shown and described in connection with FIGS. 8 and 9.

FIG. 8 shows light-guide stack 22 and the rest of the glazing laminate 24. In glazing 24 an inner transparency 26 and an outer transparency 28 are separated by an interlayer of PVB 30. During the lamination process, the transparency layers 26 and 28 are bonded to PVB layer 30 such that if the transparencies 26 or 28 should fracture, they are sufficiently bonded to PVB layer 30 that shards of transparencies 26 or 28 generally remain attached to PVB layer 30.

To limit weight, reduce material cost, and other factors, the overall thickness of glazing 24 is made as low as possible. However, it has been found that the practical effect of certain performance requirements for the glazing such as opposition to wind loading, impact resistance, chip resistance, shatter resistance, and other factors impose a minimum thickness for vehicle glazings. The minimum thickness of a vehicle glazing varies depending on the purpose and orientation of the glazing in the vehicle, but commercial factors have established generally minimum thicknesses for conventional transparency layers and conventional laminate layers. For PVB used in windshields, the nominal thickness of the conventional PVB layer is 0.76 mm. In some cases, a thinner layer of PVB that is 0.38 mm may be used in vehicle windshields.

It has been found that for glazings such as shown in FIGS. 8 and 9 where the light-guide stack 22 interfaces with an end of PVB interlayer 30, the overall thickness of the light-guide stack must closely approximate the overall thickness of PVB layer 30. The overall thickness of light-guide stack 22 must closely approximate the overall thickness of PVB interlayer 30 to avoid visible distortions, bubbles and other unwanted effects that may occur during the lamination process. Accordingly, a motor vehicle glazing that is intended for use as a windshield wherein the nominal thickness of the PVB interlayer is a standard 0.76 mm, the thickness of the light-guide stack also must be approximately 0.76 mm. to avoid visible distortion of the glazing following lamination.

In an example of the embodiment of FIG. 8, light-guide stack 22 includes a PC film 32 with cladding layers of PET 38 and 40 that are bonded to opposing faces of PC film 32 by respective layers of silicone 34 and 36. In other examples, cladding layers other than PET bonded by silicone could also be used. The thicknesses of the PC film 32, cladding layers 38 and 40 and silicone layers 34 and 36 are substantially less than the thickness of PVB interlayer 30 of 0.76 mm (30 mil). For example, the PC film thickness is approximately 0.127 mm (5 mil), the PET cladding layer thicknesses are approximately 0.076 mm (3 mil) (each), and the thickness of the silicone layers is approximately 0.041 mm (1.6 mil) (each). To make the thickness of light guide laminate stack approximate the thickness of PVB interlayer 30, two spacing layers 42 and 44 are included. Spacing layers 42 and 44 are capable of binding the PET layers 38 and 40 to respective transparencies 26 and 28. In the example of FIG. 3, spacing layers 42 and 44 are made of PVB. Other compositions such as EVA and PU also could be used for spacing layers 42 and 44. In some cases, the light guide stack may be composed of a layer of PC film 32 and layers of EVA or PU that bond to PC film 32 and transparencies 38 and 40 and avoid need for layers of PET, PVB, or other layers. PVB, PU and EVA are commercially available in a thickness of about 0.38 mm (15 mil). By selecting spacing layers 42 and 44 with a nominal thickness of 0.38 mm (15 mil), the overall thickness of the light guide laminate stack sufficiently approximates the overall thickness of PVB interlayer 30 to avoid the difference in thickness from being a source of visible distortions, bubbles and other unwanted effects during the lamination process.

In accordance with the disclosed protective housing, light-guide stack 22 forms an interlayer between inner transparency 26 and outer transparency 28. In the presently disclosed invention, the transparencies 26 and 28 may be glass. Because PET does not bond to glass, the PET layers in the light-guide stack 22 are covered with respective PVB layers 42 and 44. The thickness of the overall light-guide stack 22 includes both of the PVB layers 42 and 44 that cover the PET layers 38 and 40. The light-guide stack 22 must approximately equal the nominal thickness of PVB layer 30. In the illustration of FIG. 8, the thickness of PC film 32, silicone layers 34 and 36, PET layers 38 and 40 and PVB layers 42 and 44 must approximately equal 0.76 mm, the thickness of PVB interlayer 30.

It has been found that while attaining the overall thickness of light-guide stack 22 to match the thicknesses of PVB layer 30, the selection of the respective thickness of PC film 32, silicone layers 34 and 36, PET layers 38 and 40 and PVB layers 42 and 44 is not merely a matter of selecting or modifying commercially available products through routine experimentation to achieve the necessary total thickness. Other factors and limitations that result in variables that are not apparent to one normally skilled in the art also must be accommodated. In fact, the identification and selection of the preferred thickness for the respective layers in light-guide stack 22 occurs in a manner that is counter-intuitive and contrary to previously known choices and methods.

For example, PVB layers 42 and 44 must have a minimum thickness that will support adequate lamination with respective glass layers 26 and 28. This is necessary to enable portions of glazing 24 that incorporate light-guide stack 22 to comply with various performance requirements for windshield impacts such as avoidance of free glass shards upon fracture and other factors. Also, it has been found that PET layers 38 and 40 in light-guide stack 22 must have a thickness of at least 0.0762 mm (3 mil). This is necessary to avoid certain undesirable consequences to the PET layers during lamination—namely, flowing, wrinkling and orange pealing action of PET layers 42 and 44 during the autoclave step of lamination. The use of PET layers that are typical of normal PET layers (typically about 0.0508 mm) was surprising and unexpected because, in the prior art, it was determined that PET layers exhibiting such effects should be made thinner than 3 mil—not thicker as according to the presently disclosed invention. As another example, it has been found that the PC film thickness must be 2 mil to avoid wrinkling of the PC film during the autoclave step of lamination. Preferably, the thickness of the PC film is as much as 5 mil and, more preferably, in the range of 3 to 4 mil.

FIG. 9 illustrates that according to the presently disclosed invention it has been found preferable to remove PET layers 38 and 40 and silicone layers 34 and 36 from the portion of PC film 32 that extends as tab 13 beyond the perimeter of the transparencies 26 and 28. In addition, it has been found preferable that the PC film 32 is made thinner than the usual thin-film light guide. Preferably, the thickness of PC film 32 is in the range of 0.0508 mm (2 mil) to 0.127 mm (5 mil). The reason for the removal of the PET and silicone layers from the extended tab portion of PC layer 32 and for the limitation on thickness of PC film 32 is for purposes of an improved method of manufacture. These modifications and limitations on the PC film afford the PC film enhanced flexibility that accommodates the commercial process for forming vehicle glazings.

In the commercial manufacture of vehicle glazings, the glazing stack is subjected to a vacuum process prior to the autoclave step of lamination. The purpose of the vacuum process is to remove air that is trapped between the various layers of the glazing prior to the autoclave step of lamination. If excess air remains between the layers, the glazing may tend to exhibit visual defects such as bubbles. Other unwanted consequences such as delamination may also occur.

To remove the excess air, a vacuum ring is placed around the perimeter of the glazing 24 before lamination. The vacuum ring closely abuts the edge of the glazing 24 so that vacuum conditions inside the ring are communicated to the interior of the glazing. In this way, air is drawn from between the layers of the glazing and into the vacuum ring until sufficient vacuum levels inside the glazing stack are established.

For the vacuum ring to effectively communicate vacuum conditions to the interior of the glazing stack, the ports on the vacuum ring must be close to the edge of the glazing stack. This means that the clearance tolerance between the perimeter edge of the glazing stack and the inwardly facing side of the vacuum ring must be small. As previously explained in connection with FIG. 1, a tab portion 13 of PC film 12e extends beyond the perimeter edge 12c and 12d of transparency sheets 12a and 12b of the glazing so that light bar 14 transmits light into PC film 12e through an exposed edge 13a of PC film 12e. However, since tab 13 of PC layer 12 extends beyond the perimeter of transparency sheets 12a and 12b, the vacuum ring will interfere with tab 13 as the vacuum ring is positioned around the perimeter edge of the glazing stack.

Previously, it was thought that PC film 12e must have sufficient mechanical strength to tolerate contact with the vacuum ring. This led to designs wherein the PET cladding layers 38 and 40 on the PC film 32 throughout tab 32 were maintained and PC film 32 even made thicker to give PC film 32 added mechanical strength to tolerate contact with the vacuum ring. However, surprisingly, the disclosed invention yields the opposite result.

First, PET layers 38 and 40 and silicone layers 34 and 36 are completely removed from PC film 32. Secondly, PC film 32 is thinner than the thicknesses previously known. PC film 32 survives interference with the vacuum ring by reason of its flexibility—not mechanical strength. PC film 32 is sufficiently flexible to bend out of the path of the vacuum ring without damage to the PC film while the vacuum ring still draws sufficient vacuum at the interior of the glazing. This is contrary to a requirement of added mechanical strength produced by a relatively thicker PC film.

The embodiment shown and described in connection with FIGS. 7-9 may further incorporate a light source such as a light guide that is secured to the tab portion of PC film 32. The light source may be added prior to delivery of the glazing to the place of vehicle assembly or the light source may be added to the glazing as part of the larger process of vehicle assembly.

Figure 4:
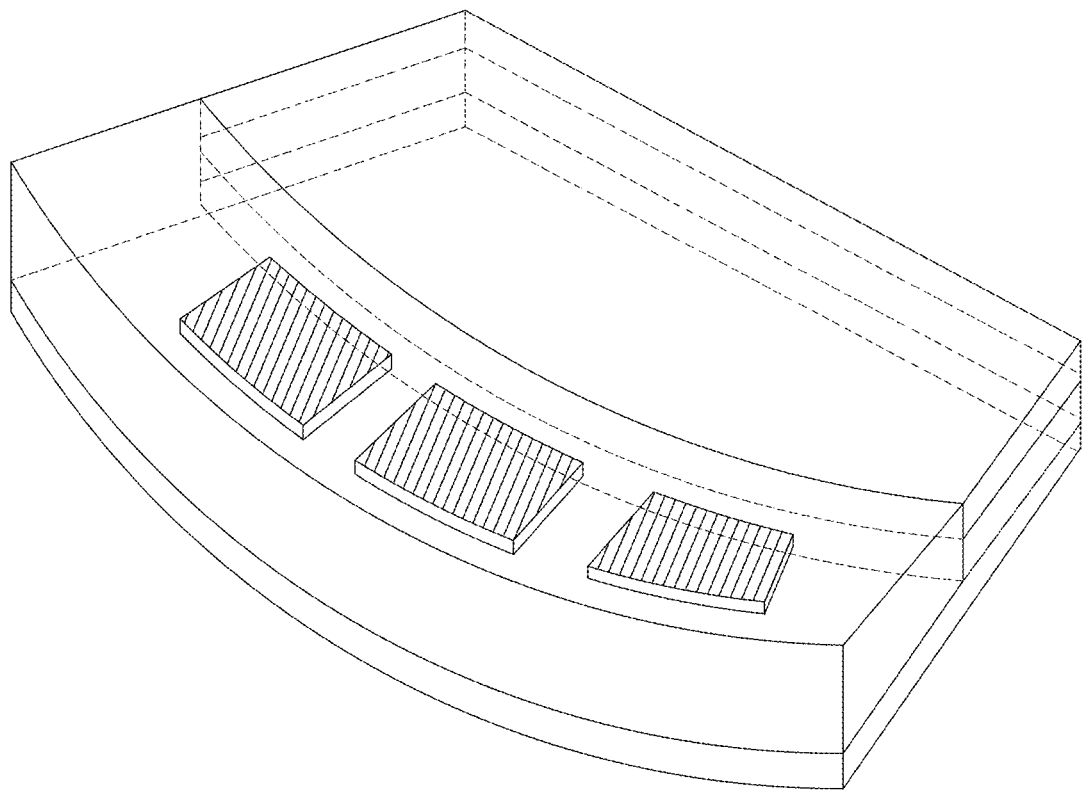
FIG. 4 is a perspective view of the disclosed protective housing in combination with an alternative embodiment of a light guide glazing of the type that is further disclosed in FIG. 10.
Figure 5:
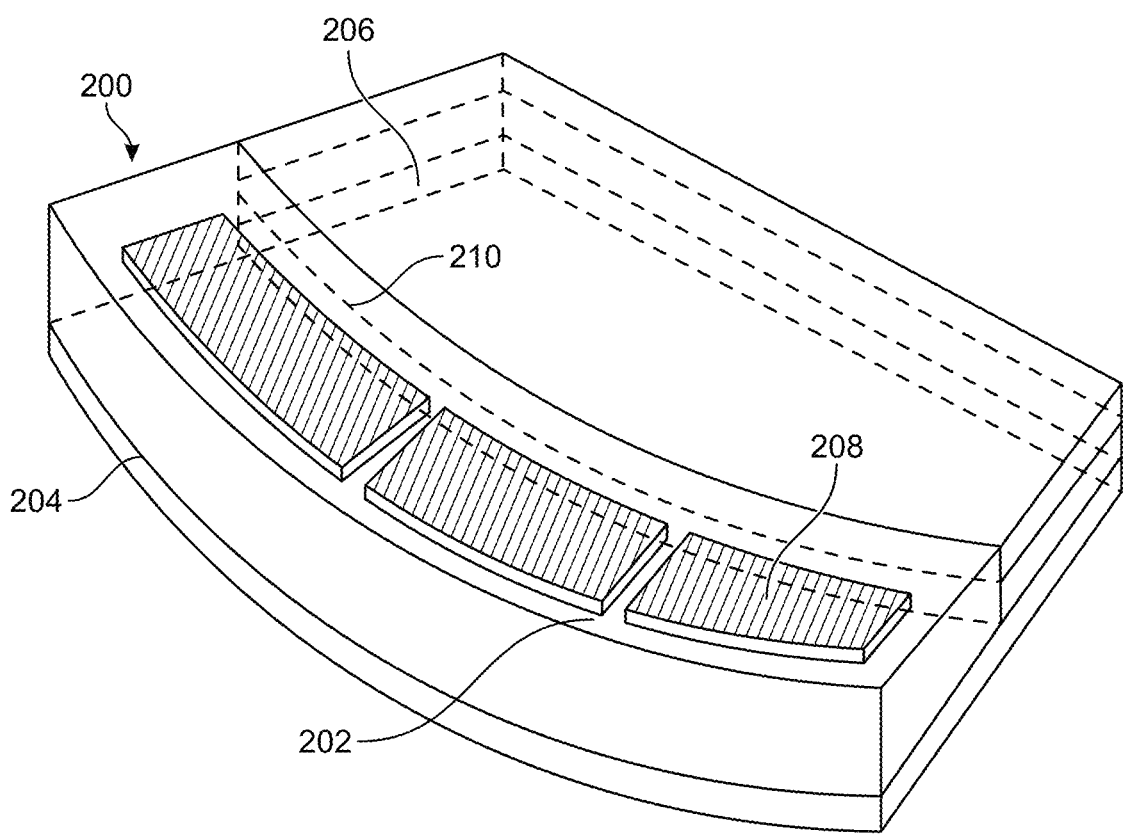
FIG. 5 is an enlarged view of portions of the disclosed protective housing that is shown in FIG. 4.
Figure 10:
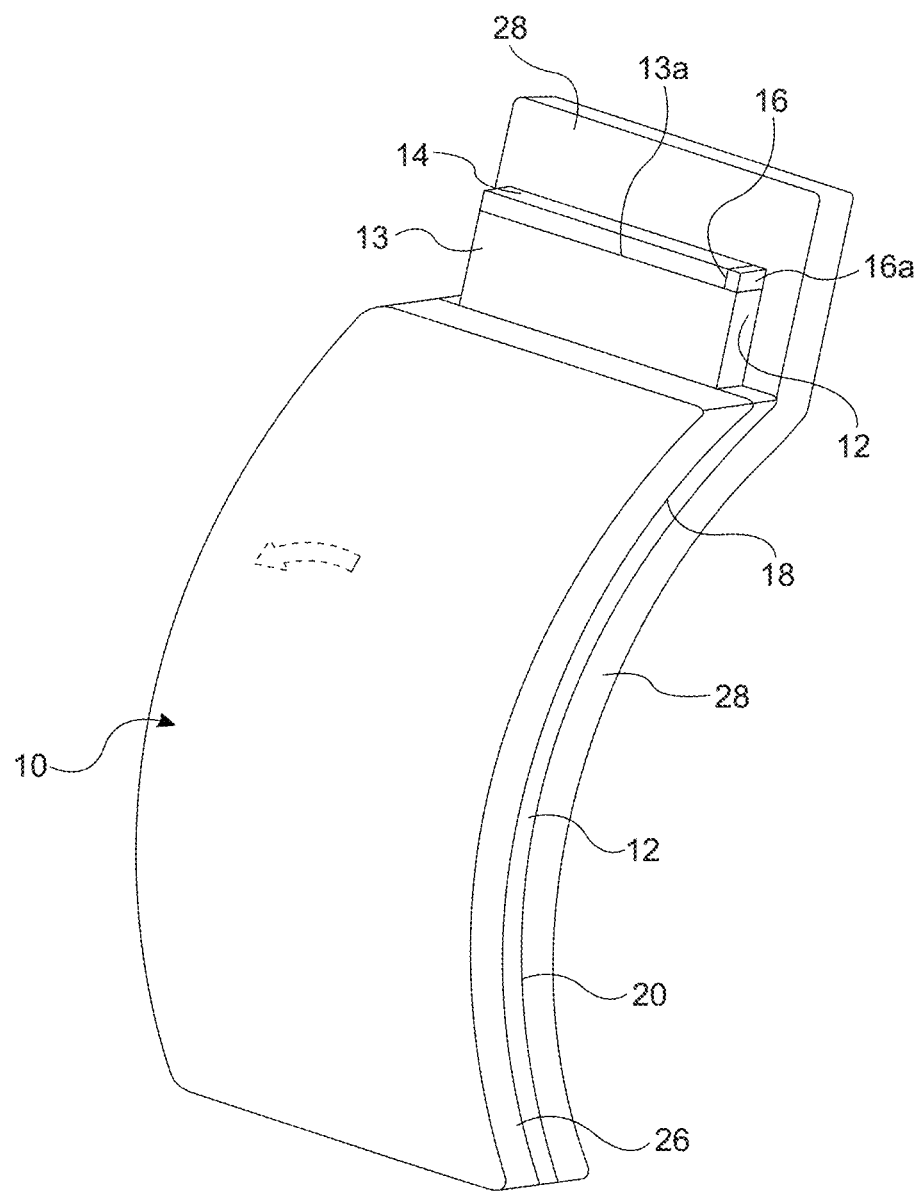
FIG. 10 is an alternative embodiment of a light guide glazing of the type that is included in FIGS. 4 and 5.

FIGS. 4 and 5 show the presently disclosed protective housing in combination with an alternative form of light guide glazing that is further described herein in connection with FIG. 10. FIGS. 4 and 5 illustrate that one glass layer of the glazing extends beyond the perimeter of the other glass layer. In this way, the extending glass layer forms a ridge or shelf that is capable of supporting the light bar that is the light source for the light guide film. FIGS. 4 and 5 illustrate how a protective housing as herein disclosed is protective of the light bar and light film that are external to the perimeter edge of the smaller glass layer of the glazing.

In FIGS. 4 and 5, a protective housing 200 includes a part 202 that is secured to glass layer 204 and glass layer 206 to cover and protect the light bar 208 and the portion of the light guide film 210 that extends between the peripheral edge of glass layer 206 and light bar 208. Part 202 is sealed to glass layer 204 by a bead of urethane or other adhesive that is suitable for the application.

FIG. 10 shows an alternative glazing of the type that is shown in the embodiment of FIGS. 1-4. In FIG. 10, PC film 12e includes PC film tab 13 that terminates at edge 13a. Light bar 14 is connected to edge 13a of PC film 12e as described in connection with FIG. 6. As also described in connection with FIG. 6, when end 16 of light bar 14 is illuminated, light propagates from light bar 14 through edge 13a and into PC film 12. However, in the embodiment of FIG. 10, glass sheet 28 extends beyond edge 13a of tab 13 and beyond at least a portion of light bar 14. In this way, light bar 14 may be secured to glass sheet 28 by a bonding agent or other suitable fastening method so that glass sheet 28 mechanically supports light guide 14 and affords greater stability for light guide 14 and PC film tab 13 that is outside the perimeter sides of transparency 26.

The structure illustrated in FIG. 10 provides greater durability during manufacturing and handling of glazing 10 as well as at the time that glazing 10 is installed in the vehicle. It has been found that this structure tends to protect PC film 12 from breaking or tearing during handling or in the process of attaching the light guide after autoclaving. The extended portion of glass sheet 28 can also assist as a guide in positioning glazing 10 during installation in the vehicle and for maintaining stability of tab 13 and light guide 14 as the glazing is installed.

For the embodiment of FIG. 10, a vacuum channel is not generally suitable for deairing the glazing laminate stack because the clearance tolerance of the vacuum channel does not accommodate the difference in the perimeters of transparencies 26 and 28. For example, a vacuum channel that passes close to the edge of transparency 26 would interfere with the extended portion of transparency 28. Accordingly, for the embodiment of FIG. 10, a vacuum bag or equivalent device may be used to deair the glazing prior to heating in an autoclave or other curing process.

It has been found that the extended portion of glass sheet 28 may afford protection for PVB, polyurethane, or other interlayer materials, especially after such materials have been somewhat embrittled by an autoclave or other heating or curing process. For example, when the glazing is installed in the vehicle opening there is a risk that the extended tab will be damaged by contact with the vehicle body.

Figure 11:
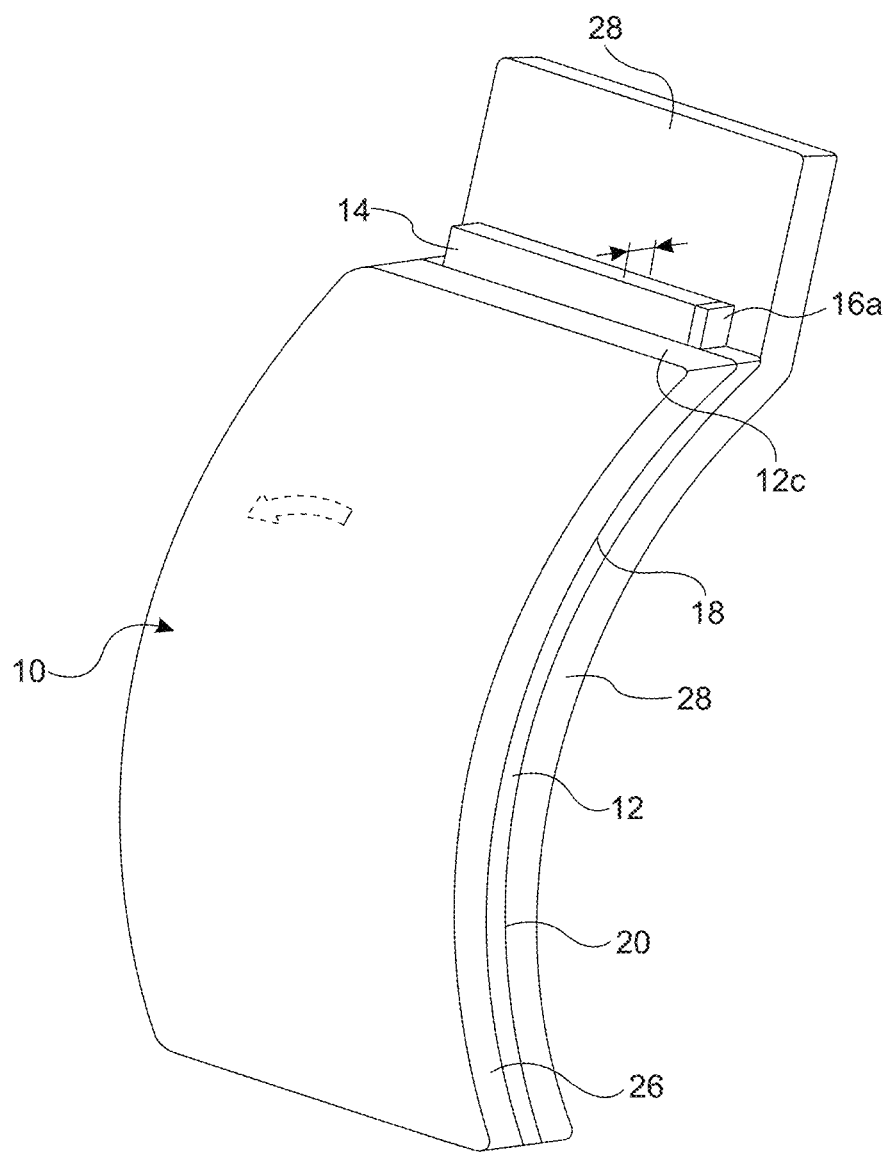
FIG. 11 is another alternative embodiment of the disclosed light guide glazing wherein a glass layer extends from the main body of the glazing and wherein the light guide body contacts the edge of another glass layer.

FIG. 11 further shows that light bar 14 is in contact with the perimeter side edge 12c of transparency 26. When light bar 14 is positioned in contact with the perimeter side edge in this way prior to autoclaving, the body of light guide 14 forms a seal with the perimeter side edge of transparency 26 during the autoclave step of lamination. This seal aids in maintaining lamination of the light guide stack and avoiding bubbles in the laminate, especially near the perimeter boundary of transparency 26. To aid in formation of such a seal, the presently disclosed invention employs a light guide having a body made of Delrin™ or similar plastic material.

The embodiment of FIG. 11 also illustrates that it is preferred that the thickness of the light guide is no greater than 3.0 mm. (measured in a direction orthogonal to the surface of inner transparency 28). More preferably, the thickness ("T") of light guide 14 is 2.6 mm or less. The thickness of light guides such as used in connection with the embodiment of FIGS. 1-4 is typically 5 mm. However, the lower profile (thickness) of the light guide preferred for the embodiment of FIG. 6 allows the light bar to butt against the perimeter edge of inner transparency 26 with a maximum elevation of the assembled glazing (including the light bar) not higher than the outer surface of outer transparency 26. In this way, the assembled glazing is compatible with standard size and shape openings for receiving glazings in many vehicles.

The presently disclosed protective housing is significant due, in part, to the limited volumes and areas for placing components and accessories that are connected to a vehicle glazing. Such limited areas make installation of the glazings more difficult and increase the risk that glazings without the presently disclosed protective housing will be damaged during installation of the glazing. Moreover, the presently disclosed protective housing allows the installation of the glazing faster and easier than if each connection and external component must be closely observed during installation. Such advantages allow for a faster, more reliable, yet less costly assembly process.

Other advantages of the presently disclosed protective housing will be advantageous for use in connection with automotive glazings such as side windows where the glazing is movable with respect to the frame of the vehicle. Such glazings are sometimes referred to as "moving glass." In moving glass applications wherein electronic, light guide and other system components are intimately connected to the glazings but external to the glazing, the disclosed protective housing may be helpful in implementing the system design or in extending the anticipated useful life of the system. Examples may include moving glass wherein controllers, circuit boards or other electronic components are attached to glazing connectors and secured to the glazing by the disclosed protective housing. One specific example may be moving glass wherein the components and protective housing are attached below the beltline (i.e. the location on the glazing that is never exposed beyond the vehicle body— even when the glazing is exposed to its fullest extent). With the components attached to the glazing below the beltline, they may ride with the glazing as it moves up and down. This design may provide significant packaging efficiency and avoid steps during the vehicle assembly process. Another advantage is that the circuit components remain close to and at the same relative positions with respect to the glazing to reduce fatigue in the connectors. Applications where this may be advantageous include Micro-LED displays and capacitive touch keyboards.

The disclosed protective housing also would be useful on non-moving glass such as windshields. In such applications, the protective housing may protect devices and components attached to connectors at the lower edge of the windshield. However, the presently disclosed protective housing may be applied to protect connectors and devices adjacent any edge of a windshield or other glazing (including moving glazings) such that the top or side edges of glazings of all types also may be associated with the disclosed housing. In addition, other benefits may include protection of solder connections in the case of heated glass or even, in some cases, eliminating solder connections and using the protective housing itself as the mechanism to maintain mechanical clamping of heating components.

In addition to the forgoing, the disclosed protective housing may be used during the manufacturing process for protection of components that are associated with the glazing. For example, the protective housing may be used to protect components that are attached to the glass laminate during processes for encapsulating the glass.

We claim:

1. A housing for use in connection with glazings that include a first transparency sheet that defines a first perimeter edge and a second transparency sheet that defines a second perimeter edge, said glazing having a connecting lead that extends outside the perimeter edge of at least one of said first and second transparency sheets, said housing comprising:
   a first housing part;
   a first layer of adhesive that connects said first housing part to said first transparency sheet of said glazing;
   a second housing part having a shape that is complementary to the shape of said first housing part such that said first housing part fits together with said second housing part in mating relationship with said first housing part and said second housing part covering at least a portion of said connecting lead where said connecting lead extends outside at least one of the first perimeter edge of said first transparency sheet or the second perimeter edge of said second transparency sheet;
   a second layer of adhesive that connects said second housing part to said second transparency sheet of said glazing;
   a third layer of adhesive that connects said first housing part and said second housing part;
   a first seal that blocks the passage of fluids between said first housing part and said first transparency sheet;
   a second seal that blocks the passage of fluids between said second housing part and said second transparency sheet;
   a third seal that is located between said first housing part and said second housing part, said third seal blocking the passage of fluids between the first housing part and said second housing part.

2. The housing of claim 1 wherein said connecting lead is connectable to a light guide device.

3. The housing of claim 2 wherein said connecting lead includes a light guide film.

4. The housing of claim 1 wherein said first heat sink and said second heat sink contact said light guide device at times when said first housing part is closed against said second housing part.

5. The housing of claim 1 wherein said first heat sink and said second heat sink contact said light guide device at times when said first housing part is closed against said second housing part.

6. The housing of claim 5 further comprising at least one snap tab that secures said first housing part together with said second housing part.

7. A glazing comprising:
   a first transparency sheet that defines a first perimeter edge;
   a second transparency sheet that defines a second perimeter edge wherein the perimeter edge of said second transparency sheet extends outwards past the perimeter edge of said first transparency sheet;
   a light guide laminate stack that is located between said first transparency sheet and said second transparency sheet, said light guide laminate stack including at least one polycarbonate film, said polycarbonate film that defines oppositely facing surfaces that are joined by a perimeter edge, at least one of said surfaces of said polycarbonate film being etched such that light propagating through said polycarbonate film is emitted through said etched portions of said at least one surface of said polycarbonate film;
   a connecting lead that extends away from the polycarbonate film of said light guide laminate stack and outwardly past the perimeter edge of said at least one transparency sheet, and
   a housing that includes:
      a housing body;
      a layer of adhesive that secures said housing body to said first transparency sheet of said glazing; and
      a layer of adhesive that secures said housing body to a portion of said second transparency sheet that extends laterally past the perimeter edge of said first transparency sheet with said housing body covering at least a portion of said connecting lead that extends beyond the perimeter of said first transparency sheet.

8. The glazing of claim 7 further comprising a light source with said connecting lead connected between said light source and said light guide laminate stack.

9. The glazing of claim 8 wherein said light guide laminate stack further includes at least one cladding layer of polyethylene terephthalate that faces one of said surfaces of said polycarbonate film.

10. The glazing of claim 8 wherein said glazing further includes an interlayer that is located between a portion of said first transparency sheet and a portion of said second transparency sheet.

11. The glazing of claim 10 wherein said light guide laminate stack further includes at least one layer of spacing material.

12. The glazing of claim 8 wherein said light source comprises a light bar that is connected to an edge said polycarbonate film.

13. The glazing of claim 7 wherein the portion of the second transparent sheet that extends beyond the perimeter edge of the first transparent sheet forms a shelf for supporting a light source.

14. A protective housing for use in connection with the storage, transportation, and installation of glazings that include first and second transparency sheets and that have a connecting lead that extends outside the perimeter of at least one of said first and second transparency sheets of said glazing, said protective housing comprising:
 a first housing part;
 a layer of adhesive that connects said first housing part to a first transparency sheets of said glazing;
 a second housing part having a shape that is complementary to said first housing part such that said first housing part and said second housing part fit together in mating relationship and cover at least a portion of said connecting lead where said connecting lead extends beyond the perimeter edge of said at least one of said first and second transparency sheets; and
 a second layer of adhesive that connects said second housing part to a second transparency sheet of said glazing.

15. The protective housing of claim 14 further comprising:
 a first seal that is located between said first housing part and said first transparency sheet and that blocks the passage of fluids between said first housing part and said first transparency sheet;
 a second seal that is located between said second housing part and said second transparency sheet and that blocks the passage of fluids between said second housing part and said second transparency sheet; and
 a third seal that is located between said first housing part and said second housing part, said third seal blocking the passage of fluids between the first housing part and said second housing part.

16. The protective housing of claim 14 wherein said glazing includes a light guide laminate stack between said first transparency sheet and said second transparency sheet and further comprising a light source that is connected to said light guide laminate stack.

17. The protective housing of claim 16 wherein said glazing further includes an interlayer that is located between said first transparency sheet and said second transparency sheet.

18. The protective housing of claim 17 wherein said light guide laminate stack further includes at least one layer of spacing material.

19. The protective housing of claim 17 wherein said light guide laminate stack includes a polycarbonate film and wherein said light source is connected to said polycarbonate film.

20. The protective housing of claim 17 wherein said first housing part and said second housing part cooperate to envelop a connector and a light source that is connected to said connector at times when said first housing part is joined in mating relationship with said second housing part.

21. The protective housing of claim 16 wherein said light guide laminate stack defines a perimeter edge that is located inside the perimeter side defined by at least one of said first transparency sheet or said second transparency sheet.

* * * * *